United States Patent [19]

Schwarz

[11] Patent Number: 4,982,176

[45] Date of Patent: Jan. 1, 1991

[54] SOLAR POWERED LIGHTING AND ALARM SYSTEMS ACTIVATED BY MOTION DETECTION

[76] Inventor: Frank Schwarz, 156 Thunderhill Dr., Stamford, Conn. 06902

[21] Appl. No.: 466,226

[22] Filed: Jan. 17, 1990

[51] Int. Cl.⁵ .................. G08B 13/18; H01J 40/14; F21L 7/00
[52] U.S. Cl. ..................... 340/567; 250/214 AL; 250/342; 340/539; 362/183
[58] Field of Search ............. 340/567, 541, 555, 565, 340/693, 539; 250/214 AL, 221, 342, 349, 353; 362/802, 183

[56] References Cited

U.S. PATENT DOCUMENTS

| | | | |
|---|---|---|---|
| 3,258,705 | 6/1966 | Schwarz | 330/25 |
| 3,459,961 | 8/1969 | Ravas | 307/116 |
| 3,958,118 | 5/1975 | Schwarz | 250/221 |
| 4,186,388 | 1/1980 | Robinson | 340/556 |
| 4,314,198 | 2/1982 | Rogers | 323/351 |
| 4,342,987 | 8/1982 | Rossin | 340/567 |
| 4,384,317 | 5/1983 | Stackpole | 362/183 |
| 4,433,328 | 2/1984 | Saphir et al. | 340/555 |
| 4,450,351 | 5/1984 | Fraden | 250/221 |
| 4,486,820 | 12/1984 | Baba et al. | 362/183 |
| 4,539,516 | 9/1985 | Thompson | 320/48 |
| 4,663,521 | 5/1987 | Maile | 250/221 |
| 4,701,693 | 10/1987 | Nishimura | 323/303 |
| 4,703,171 | 10/1987 | Kahl et al. | 250/221 |
| 4,772,990 | 10/1988 | Lineham et al. | 362/183 |
| 4,804,858 | 2/1989 | Jorlov et al. | 307/66 |
| 4,835,664 | 5/1989 | Wen | 362/183 |
| 4,843,525 | 6/1989 | Williams | 362/157 |
| 4,862,141 | 8/1989 | Jordal | 340/541 X |

Primary Examiner—Joseph A. Orsino
Assistant Examiner—Thomas J. Mullen, Jr.
Attorney, Agent, or Firm—David P. Gordon

[57] ABSTRACT

Solar powered outdoor lighting and/or alarm systems are provided and include a light source or alarm, a passive infrared (PIR) sensor in conjunction with a battery recharged via solar cells, and a control circuit coupled to the light source or alarm, the PIR sensor, and the rechargeable battery. The control circuit guarantees that the light source or alarm is turned on by the battery only when the sensor senses the presence of a moving target. The systems may include a light detector which is utilized to prevent the system from activating in daylight. In the case of a lighting system, a timer is utilized to turn off a lamp after a desired period of time (e.g. 3 minutes). By limiting the "on-time" of the light source, a two to five watt bulb may be used. In the case of an alarm, the alarm may be hardwired to the control circuit; or if desired, a transmitter powered by the rechargeable battery may be used to transmit an alarm signal to a remote receiver. The receiver is in turn coupled to its own power supply and to a control circuit which controls or switches desired components such as horns, bells, lights, etc.

20 Claims, 5 Drawing Sheets

SCHEMATIC SOLAR POWERED
PIR LIGHT/RF CONTROL SYSTEM

SOLAR POWERED LIGHTING AND ALARM SYSTEMS ACTIVATED BY MOTION DETECTION

BACKGROUND

The present invention relates to solar powered lighting systems principally for outdoor illumination. More particularly, the invention relates to solar powered lighting systems and/or solar power alarm systems which require the sensing of low background light level in conjunction with the detection of an emitted long wavelength radiation before activation.

Solar powered lighting systems have been known in the art for some time and are readily available in the marketplace for outdoor lighting purposes. Basically, and as disclosed in U.S. Pat. No. 4,835,664 to Hung-Sheng Wen, they are comprised of one or more photovoltaic cells which are used to charge a battery. The battery in turn powers a light source; the circuit being activated upon the sensing by a photocell of a low background light level. The battery keeps the light source illuminating until the battery is drained (e.g. usually within three to four hours).

The solar powered lighting systems of the art have been limited commercial success due to the limitations of such systems. In order to be at all feasible in a cost sense, the number of photovoltaic cells utilized must be kept small. Typical systems presently available are capable of storing about ten watt-hours of power. Thus, in order for the battery to power the light source upon nightfall, and to provide for the situation of cloudy days restricting power collection, the light source must be kept small; on the order of 1/10-1 watt. Such lighting, however, is often considered insufficient, even for path lighting. Also, in winter and in climates with less sunlight, the amount of power available is even smaller. Thus, when the nighttime hours are increased and the light is the most needed, the systems of the present state of the art are incapable of providing sufficient lighting.

Very recently, in an advertisement in Popular Science Magazine, October 1989, p. 86, a solar powered light system was disclosed utilizing an infrared sensor for controlling when the light source is to be turned on and off, thereby using the power only when needed. The advertisement, however, is not prior art to this invention, as the invention was conceived and reduced to practice in advance of the appearance of the advertisement.

Examples of relevant patents which are prior art to this invention include:

| Patent # | Inventor | Patent # | Inventor |
| --- | --- | --- | --- |
| 3,459,961 | Ravas | 4,539,516 | Thompson |
| 4,186,388 | Robinson | 4,772,990 | Linehan et al. |
| 4,314,198 | Rogers | 4,701,693 | Nishimura |
| 4,433,328 | Saphir et al. | 4,804,858 | Jorlov et al. |
| 4,450,351 | Fraden | 4,835,664 | Wen |
| 4,486,820 | Baba et al. | 4,843,525 | Williams |

However, none of these patents overcome the significant problems regarding the power requirements for desired illumination.

SUMMARY OF THE INVENTION

It is therefore an object of the invention to provide a solar powered lighting system which is capable of providing increased illumination.

It is another object of the invention to provide a solar powered outdoor lighting system which is not particularly susceptible to shut-off because of lack of battery power.

It is a further object of the invention to provide a solar powered outdoor lighting system which is capable of providing increased illumination but is still not susceptible to shut-off because of lack of battery power.

It is yet another object of the invention to provide solar powered alarm systems with or without lighting systems, which are activated by the movement of a person, vehicle, etc.

In accord with the objects of the invention, a solar powered lighting system is provided and overcomes the problems of the art by providing a passive infrared sensor in conjunction with the rechargeable battery/lighting circuit, such that the lamp is turned on only when needed; i.e. when the sensor senses the presence of a moving object. A timer is utilized to turn off the lamp after a desired period of time (e.g. 3 minutes). The use of a passive infrared sensor as part of the system is particularly advantageous, as it can provide the desired information without consuming much power.

The solar powered lighting system more particularly comprises:

(a) a solar cell for receiving sunlight and for generating charging current therefrom;

(b) a rechargeable power source coupled to said solar cell for receiving said current and charging as a result thereof;

(c) an infrared sensor for monitoring an area for long wavelength radiation and providing a signal indicative of the presence of said long wavelength radiation;

(d) an amplifier coupled to said passive infrared sensor and to said rechargeable power source for amplifying said signal;

(e) a light source of at least one watt;

(e) a control circuit coupled to said amplifier, to said rechargeable power source, and to said light source, including switching means for causing said rechargeable power source to be coupled to said light source so as to turn on said light source when an amplified signal is received from said amplifier, and timing means for timing the length of time said light source is on and for causing said switching means to disconnect said light source from said rechargeable power source after a desired length of time has transpired.

Preferably, the light source contains a bulb of three to five watts, and a reflector which is used to direct the light to desired areas of illumination. Also, preferably, the infrared sensor is a passive infrared sensor which is coupled to the rechargeable power source, as the passive infrared sensor utilizes minimal energy. Further, preferably, a photosensitive detector such as a photocell, is utilized to detect darkness, and the increased resistance which occurs in the dark is utilized in the control circuit to guarantee that the light source will only be activated when needed (i.e. at night).

In accord with another aspect of the invention, an RF transmitter powered by a common rechargeable power source (or by its own solar cell—rechargeable power source arrangement) is further supplied with the lighting system so as to supply a receivable RF signal to an antenna coupled to a receiver. The receiver is in turn coupled to its own power supply and to a control circuit which controls or switches desired components such as horns, bells, lights, etc.

Yet another aspect of the invention relates to the use of the RF transmitter with the solar circuit minus the light source. If desired, an outdoor horn could be used in lieu of the light source. With or without the outdoor horn, such an arrangement could serve as a solar powered alarm.

Additional advantages and objects of the invention will become apparent to those skilled in the art upon reference to the detailed description in conjunction with the provided drawings.

DETAILED DESCRIPTION OF THE PREFERRED EMBODIMENTS

Figure 1:
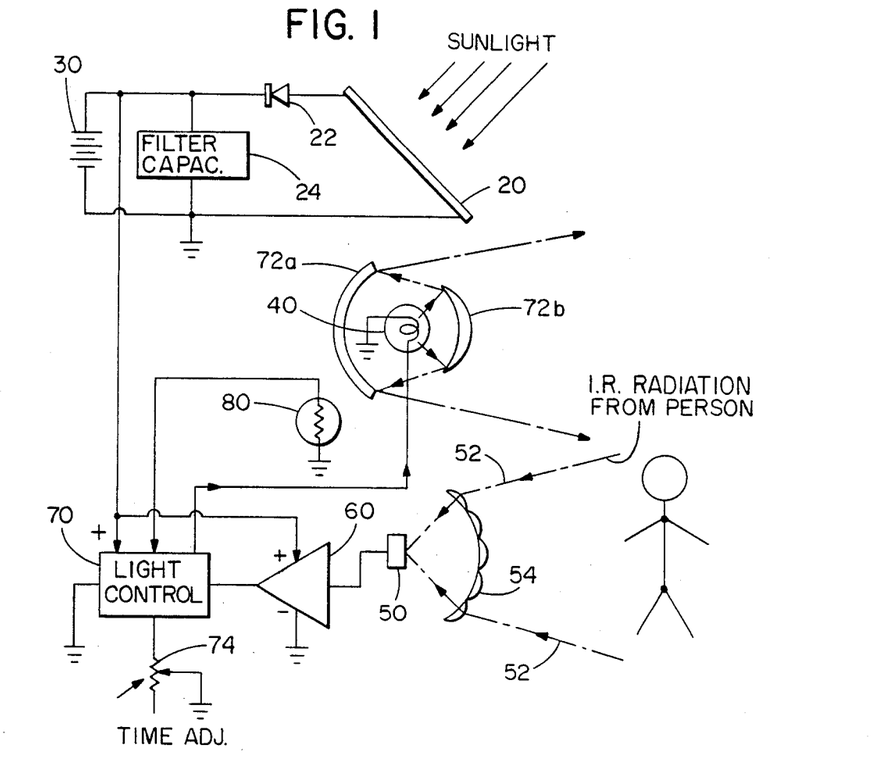
FIG. 1 is a schematic diagram of a preferred embodiment of the solar powered light source invention utilizing a passive infrared detector for sensing object movement and a photocell for sensing background lighting.

Turning to FIG. 1, the preferred embodiment of the solar powered light source system invention is seen. The system 10 is comprised of several interconnected components, including solar cells 20, a rechargeable battery 30, a lamp 40, an infrared radiation detector 50, an amplifier 60, and a light control logic and timing circuit 70. Preferably, the system 10 also includes a photocell 80.

The rechargeable battery 30 is part of a circuit which includes the solar cells 20, a diode 22, and a voltage regulator and filter capacitor 24. Such a circuit is well known to those skilled in the art. The solar cells 10 are preferably mounted on angling means (not shown) for adjusting the angle of the solar cells for the desired latitude so as to optimize absorption of solar radiation (insolation), and the entire assembly may be mounted on a stake (not shown) or other object, if desired, so that the solar cells are not on the ground. A first lead from the solar cells 20 is coupled to the positive terminal of the rechargeable battery 30 via diode 22 which guarantees that current can only run in the desired direction. A second lead from the solar cells is connected to the other (negative) terminal of the rechargeable battery. The regulator and filter capacitor 24 is connected in parallel with the battery and is provided to insure optimum battery life and high energy retention.

Figure 2:
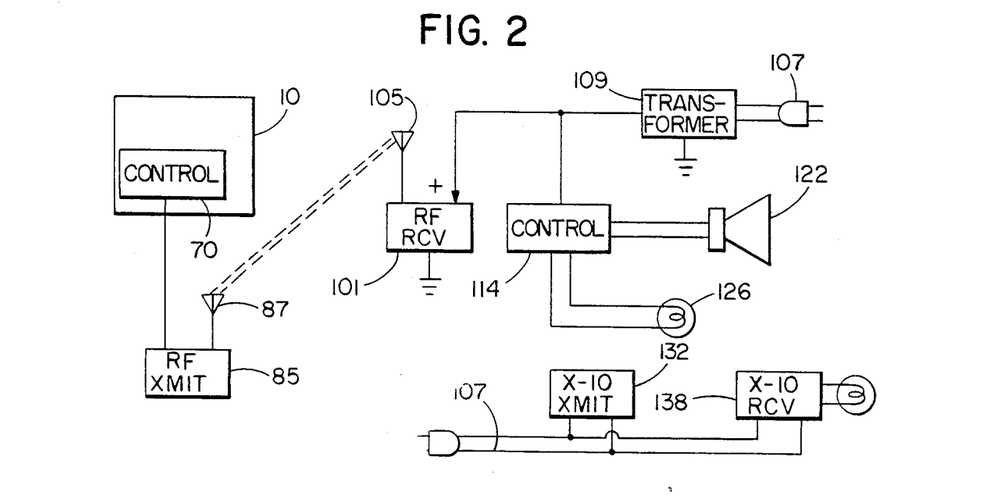
FIG. 2 is a partial block and partial schematic diagram where the system of FIG. 1 is utilized in conjunction with an RF transmitter as an alarm.
Figure 3:
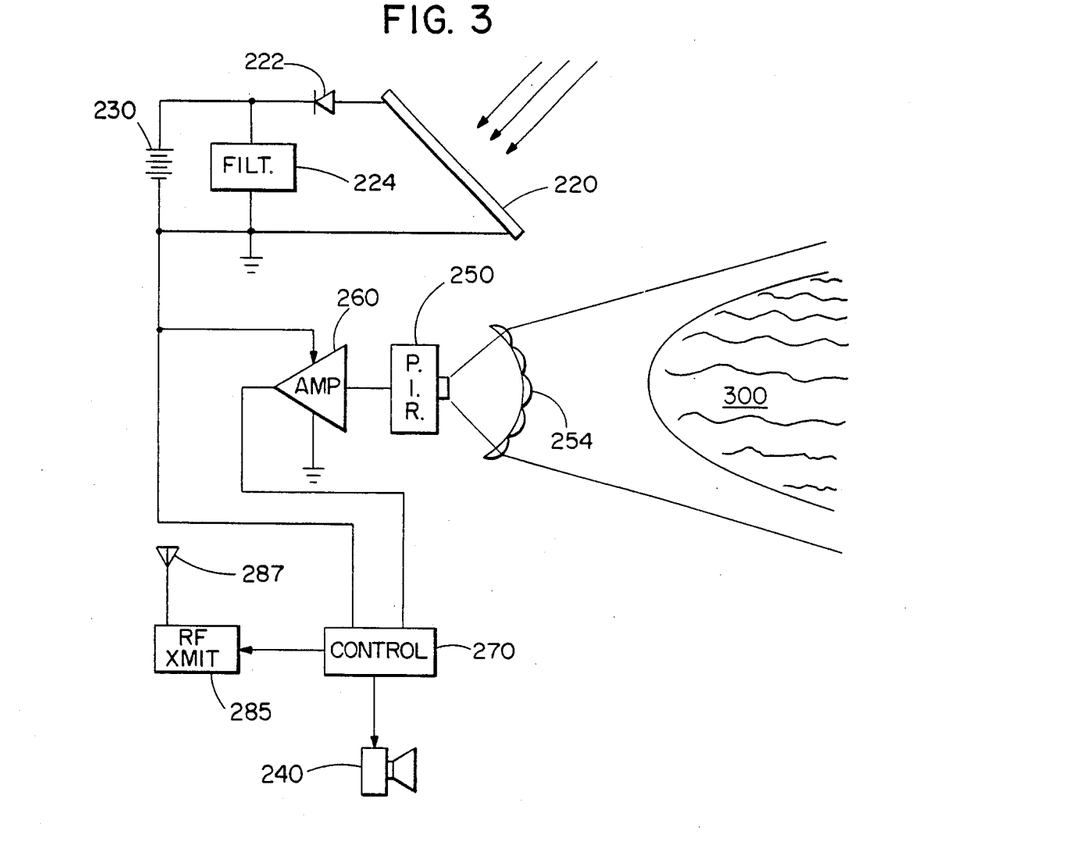
FIG. 3 is a schematic diagram of a second embodiment of the invention which utilizes a solar cell and rechargeable battery system for powering a passive infrared detector and an RF transmitter for use as an indoor/outdoor alarm.

The rechargeable battery 30 may take the form of any of many such batteries known in the art, is preferably lightweight and inexpensive, and can preferably supply about five or six volts. In the preferred embodiment, the rechargeable battery 30 is used to power the infrared radiation detector 50, the amplifier 60, the light control logic and timing circuit 70, the lamp 40 (via the control logic and timing circuit 70), and when utilized an RF transmitter (as seen in FIGS. 2 and 3).

The radiation detector 50 utilized with the system 10 is preferably a passive infrared sensor (PIR) which detects the approach or movement of a person 51, animal, or vehicle in the vicinity of the detector. The approach or movement of the object typically changes the thermal or long wavelength radiation 52 sensed by the detector which results in an electric signal which can be amplified by amplifier 60. The PIR sensor (detector) is preferably arranged as described in U.S. Pat. No. 3,958,118 issued to the inventor hereof with a lens system 54 which focuses the infrared rays on the detector 50. The PIR sensor uses a minimal amount of current (power consumption of about 10 microwatts) and is designed to operate on the low voltage supplied by the rechargeable battery. Indeed, in U.S. Pat. No. 3,258,705 that was issued to the inventor hereof, it was shown that a low voltage, low current condition is important for optimizing the signal/noise ratio for a satisfactory semiconductor preamplifier which has high enough sensitivity to detect people at substantial distances (e.g. 100 feet) by their self-emission of infrared energy.

As aforementioned, the signal output by the PIR detector 50 is amplified by amplifier 60, and fed to the light control logic and timing circuit 70. Light control logic and timing circuit 70 preferably includes the resistance of the photocell 80 as a part of a control circuit which functions to prevent the system from turning on lamp 40 unless the dual requirements of low background light level (i.e darkness) sensed by the photocell 80, and the detection of a moving object sensed by PIR detector 50 are met. In this manner, the battery charge is maintained, as charge is not wasted by lighting lamp 40 during the daytime. Similarly, the adjustable timer 74 part of the light control logic and timing circuit 70, which is indicated as a potentiometer, but which may take any of numerous forms well known in the arts, is utilized to limit the drain on battery 30. Effectively, timer 74 closes the circuit between the battery and the lamp 40 for a predetermined period of time (e.g. three minutes) when the AND gate provides a positive output. After the predetermined period of time, (which can be set in the preferred embodiment for between thirty seconds and thirty minutes by the user via the turning of a knob), the timer 74 opens the circuit between the battery 30 and the lamp 40, thereby turning off the lamp 40 and having the charge on the battery 30.

The lamp 40 of the system 10 is a bulb with a rating of at least one, and preferably three to five watts, and is powered by battery 30 via light control circuit 70. The lamp is associated with spherical reflectors or mirrors 72a and 72b which reflect the relatively large amount of light towards the area where it is needed With the reflectors 72 and the relatively high watt bulb, high brightness and efficient illumination are achieved.

With the solar powered light system 10 described, high illumination is achieved without concern that the system will shut down due to lack of energy. In particular, with an arrangement of solar cells with total area of about 200 cm$^2$, (e.g. 14 cm $\times$ 14 cm), and a typical efficiency of sixteen percent, approximately twelve watt-hours of electricity can be stored in the rechargeable battery on a day having four hours of sunshine, where the insolation is 970 W/m$^2$ per day:

$$E = Ph = 970 \ W/m^2 \times 0.02 \ m^2 \times 0.16 \times 4 \ hrs = 12.4 \ Watt\text{-}hrs$$

where E is the energy, P is the power (watts), and h is time in hours. If a four watt lamp is used, and the lamp is kept on for three minutes every time PIR sensor 50 activates the system 10 at night, and if the system is activated twenty times in a night, four watt-hours of energy will be used (4 W×20×0.05 hr=4 Watt-hrs). With twelve watt-hours stored, even after two or three rainy days, the system 10 will still provide the desired high brightness light output.

Of course, even with the efficient system 10 of the invention, tradeoffs must be made. For example, the price and weight of the battery increases as the storage capacity of the battery increases. Thus, it is desirable to provide the smallest battery capable of handling the expected load while taking into account weather variations and seasonal changes. Similarly, the price of solar cells increases with size. Hence, the solar cells should be sized in conjunction with the battery size to provide a desired charge to the battery.

Turning to FIG. 2, the solar powered light source invention 10 of FIG. 1 is shown in conjunction with further improvements. Coupled to light control logic and timing circuit 70 is an RF transmitter 85 which is also powered by rechargeable battery 30 (via the timing circuit). The RF transmitter is provided to transmit via antenna 87 a radio frequency signal which may act as an alarm. The RF signal is typically a pulse code signal which is received by receiver 101 via its antenna 105. Receiver 101 is tuned to the same frequency as the RF transmitter 85. While usually located in or near a building where line power 107 is available, it will be appreciated that the receiver 101 may also be powered by a solar cell-rechargeable battery system in the field, and that repeater systems may be set up in this manner. However, for the sake of simplicity, the receiver 101 of FIG. 2 is shown powered by line power 107 via transformer 109 which in conjunction with a rectifier (power supply) provides a direct current output to the receiver. The receiver 101 demodulates the incoming RF signal and sends a signal to a control circuit 114 which may also be powered by line power 107 or transformer 109. The control circuit is in turn coupled to one or more of a plurality of devices such as a buzzer, bell, or horn 122, and/or lights, flashing lights, or strobes 126, etc. (all of which fall broadly under the term "alarm"), and controls them in manners well known to those skilled in the art.

Alternative to the in-home receiver system is a Power Line Carrier (PLC) system such as the X-10 system of BSR or Leviton for transmitting data and remote switching over the power lines. With such an arrangement, instead of providing a control circuit 114, the RF receiver would send a signal to the PLC transmitter 132 which operates on power line 107. The PLC transmitter 132 then transmits a high frequency, coded signal to one or more PLC receivers 138 which operate on the same power line, and which are coded and tuned to transmitter 132. In this manner, the devices, such as lights, horns, or appliances may be turned on upon the detection by the system of FIG. 2 of the approach of a person or vehicle.

The alarm system of FIG. 2 can be streamlined if desired such that outdoor lights are not turned on. Such a system is seen in FIG. 3, where a solar powered indoor/outdoor alarm system 200 is seen. The alarm system 200 includes a solar cell 220, diode 222, a filter capacitor 224, and a rechargeable battery 230, all coupled as their counterparts in FIG. 1. The alarm system 200 further includes a PIR radiation detector 250, preferably with the fresnel lens 254 with an associated amplifier 260. Further, an alarm control logic and timing system 270 is provided to couple the battery 230 to the horn alarm 240, so as to sound the alarm for a desired length of time. If desired, the alarm control system 270 may be coupled to an RF transmitter 285 which sends a signal via antenna 287 to an RF receiver system such as is shown in FIG. 2. That system can sound an in-home alarm. Also, if desired, the system may include a photocell such that the system is only activated at nighttime.

The alarm system of FIG. 3 has advantageous use in conjunction with the monitoring of a pool area 300 or any area where absolute security is advantageous. If desired, the system of FIG. 3 may also be accompanied by a light source which is turned on in conjunction with the alarm.

Turning to FIGS. 4 and 4A–4C, detailed control circuitry 70 for controlling a light source such as source 40 of FIG. 1, and an RF transmitter such as transmitter 85 of FIG. 2, is seen in conjunction with a power supply (such as battery 30), and a PIR detector (such as detector 50). PIR detector 50 is seen as a dual element, opposite polarity PIR, which provides signals upon sensing of long wavelength radiation. The dual elements of opposite polarities are provided to prevent the generation of a signal due to changes in ambient conditions such as a change in temperature. The low level, high impedance signals produced by the dual element detector 50, are amplified by a field effect transistor (FET) 401 and are converted to lower impedance at the drain of the FET 401. This signal is AC coupled to preamplifier 417 via capacitor 406 and biasing resistors 414 and 415. Resistor 402, typically of the order of $10^8$ or $10^9$ ohms is used to stabilize the gate of FET 401. Resistor 413 is a load resistor for the drain of the FET 401. Resistor 412 and capacitor 411 provide a filtered positive power supply (B+) for the low level circuitry. Capacitors 403, 404, 416, and 422 serve to reduce susceptibility to radio frequency interference (RFI). The prime power source, battery 30, is decoupled and filtered by means of a diode 409 and capacitors 407 and 408.

Figure 4:
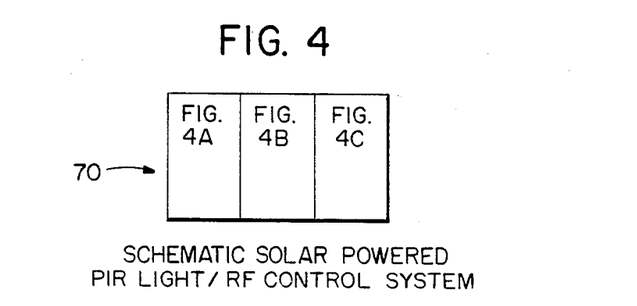
FIG. 4 shows the interrelationship between FIGS. 4A-4C which together comprise a detailed circuit diagram of the amplifier and control circuit of FIG. 1.
Figure 4A:
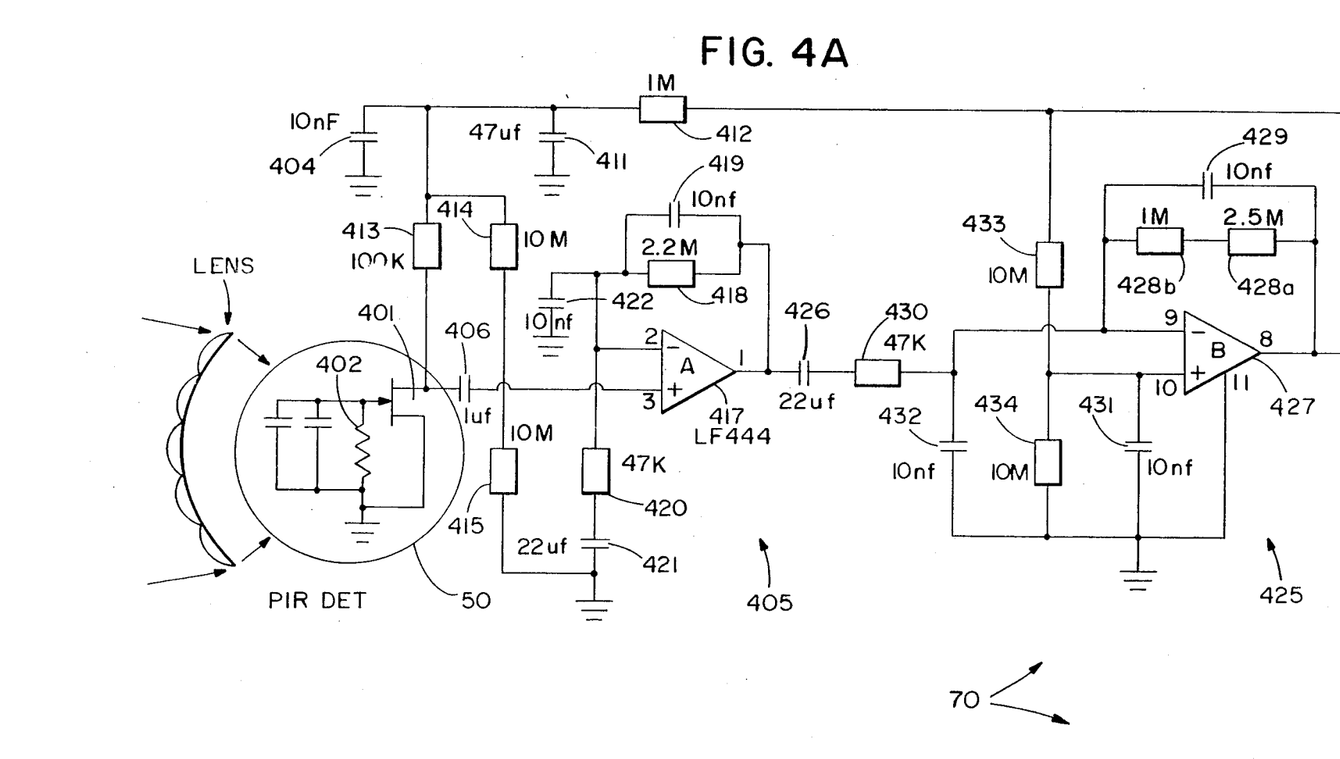
Figure 4B:
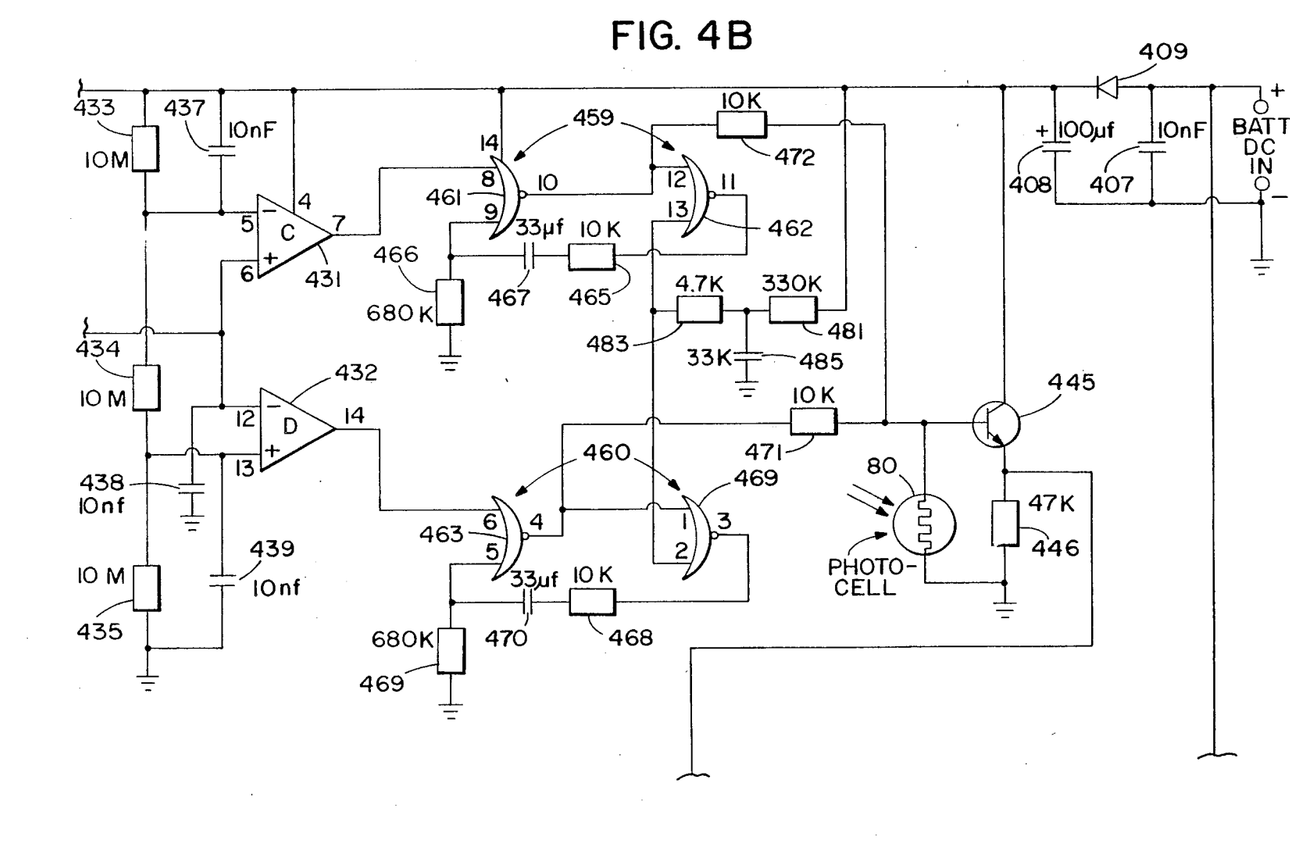
Figure 4C:
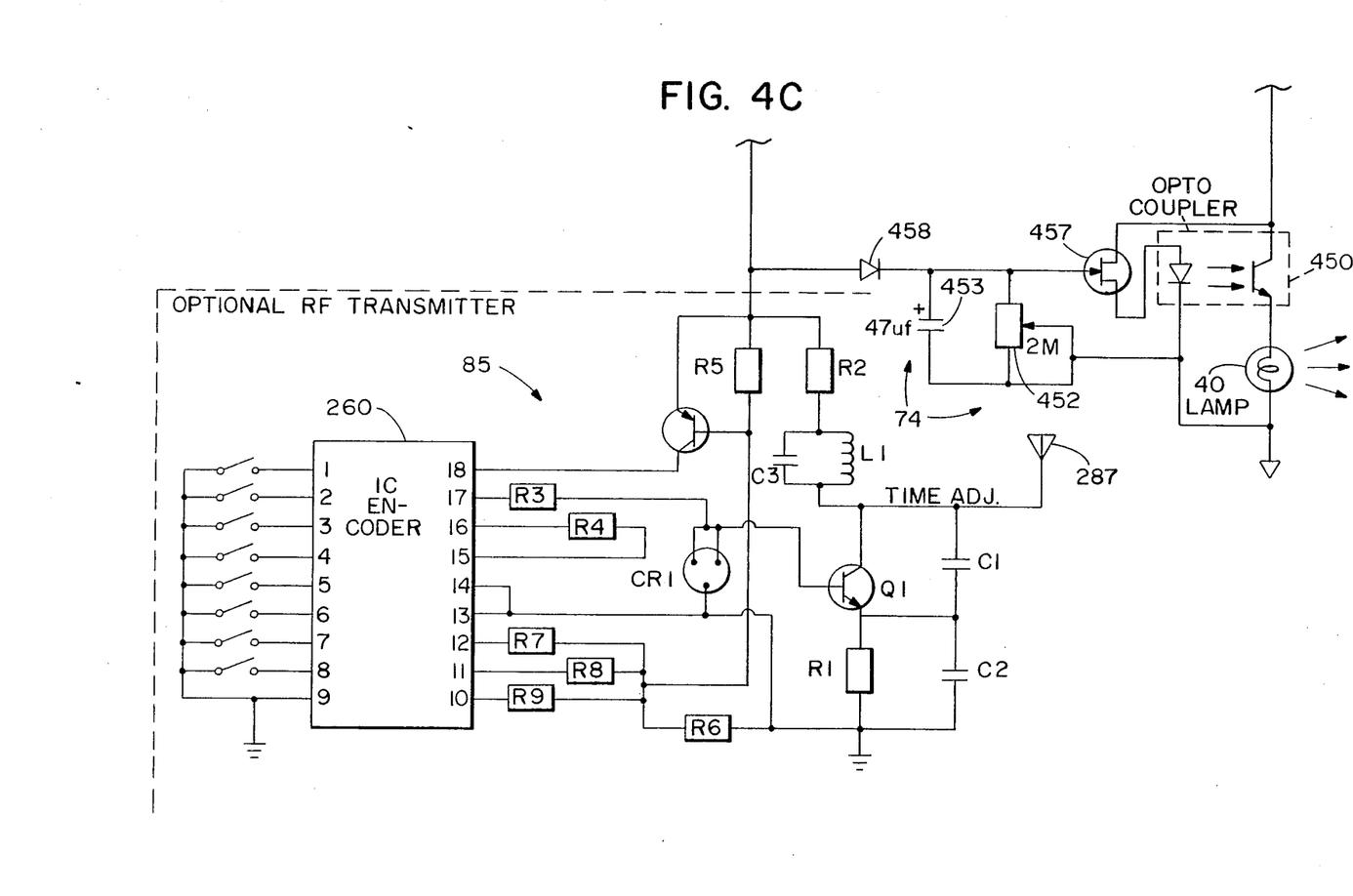

Preamplifying circuit 405 includes noninverting amplifier 417 (preferably a JFET op amp), feedback resistor 418 with capacitor 419 coupled in parallel thereto, resistor 420, and capacitors 421 and 422. The positive input to amplifier 417 is taken from capacitor 406. The negative input is taken from the feedback circuit. Resistors 418 and 420 dictate the gain of the circuit 405, with capacitor 419 causing the gain to decrease at high frequencies, and capacitor 421 effectively reducing gain at ultralow frequencies. The output of preamplifying circuit 405 is fed to amplifying circuit 425 via capacitor 426. Amplifying circuit 425 includes inverting amplifier 427, feedback resistors 428a and 428b, with capacitor 429 coupled in parallel thereto, resistor 430, and capacitors 431 and 432. Amplifier 427 is also preferably a JFET op amp, and together with amps 417, 431, and 432 comprises a quad within an integrated circuit housing. The positive input to inverting amplifier 427 is taken from voltage dividing resistors 433 and 434 which divide down the source voltage and set the steady state DC output of amplifier 427 to one half the battery voltage. The negative input to inverting amplifier 427 is taken from the output of preamplifier 417 via capacitor 426 and resistor 430. The gain of the amplifier 427 is dictated by resistors 428a, 428b, and 430, with resistor 428a being a controllable variable resistor such that gain can be set to an appropriate value. Again, the capacitor 429 coupled in parallel with the feedback resistors is supplied to decrease gain at high frequencies. In fact, the circuit is preferably tuned to emphasize frequencies of 0.2-5 Hz, which is a signal speed representing the movement of a person at one to two feet per second at a distance of about forty feet.

The output of the amplifying circuit 425 is fed as the negative and positive inputs respectively to amplifiers 431 and 432. Amplifiers 431 and 432 (which are part of the JFET quad) are threshold amplifiers. Accompanying biasing resistors 433, 434, 435 establish the voltage levels at which the amplifiers will provide full voltage output swing. In other words, one amplifier is arranged to respond to positive going pulses (relative to the voltage half point established at the output of amplifier 427) while the other amplifier is arranged to respond to relatively negative going pulses. Thus, amplifiers 431 and 432 will provide a zero output voltage until activated by pulses exceeding appropriate threshold levels. Capacitors 437, 438, 439 are provided to bypass high frequency spikes which might otherwise activate amplifiers 431 and 432.

In a simplified format (not shown), a single pulse from either amplifier 431 or 432 may be used to turn on transistor 445 so as to activate a lamp 40, as is discussed hereinafter. However, in the preferred embodiment, to avoid response to other than a moving person or vehicle, etc., two pulses of opposite polarity (movement through at least two fields of view) are required To accomplish this, two monostable multivibrators (MMV) 459, 460 each comprised of two NOR gates 461, 462, 463, 464, and timing integration components 465, 466, 467, 468, 469 and 470 are provided, with loading resistors 471 and 472 which allow the output voltage to rise to desired levels when both MMVs are activated. Thus, if MMV 459 receives a positive pulse from amplifier 431, it stretches (or holds) its output positive for a time determined by its integrator components 466 and 467 (e.g. RC =680K×33 mfd=22.44 sec). If in this time a second pulse of opposite polarity is generates, the MMV 460 will generate a positive output. The coincidence of the two results pulls the voltage at the base voltage transistor 445 high enough to cause transistor 445 to turn on.

When it is light outside, photocell 80 conducts (i.e. has low resistance), and the voltage at the base of transistor 445 is kept low. Thus, transistor 445 is kept off, even if MMVs 459 and 460 are activated. However, when it is dark, photocell 80 provides a high resistance. Hence, the voltage at the base of transistor 445 is controlled by the output of the MMVs 459 and 460 such that transistor 445 is turned on when amplifiers 431 and 432 are successively activated (thereby activating MMVs 459 and 460), and transistor 445 is kept off when amplifiers 431 and 432 are not so activated.

The emitter of transistor 445 is coupled to ground via resistor 446. When transistor 445 is turned on, the voltage at the emitter goes high, and diode 458 is positively biased. As a result, a high voltage is presented to the gate of FET 457, and FET 457 turns on. When FET 457 is on, the voltage at its drain (i.e. the battery voltage) is transferred to its source, thereby turning on opto-coupler 450 which turns on the lamp 40. Because the voltage at the gate of FET 457 is free to float after the voltage drops at the emitter of transistor 445, FET 457 is kept on until the gate voltage decays. The time response of that decay is controlled by RC circuit 74. Thus, the voltage at the gate of FET 457 eventually decreases to the point where FET 457 turns off, thereby turning off lamp 40. By making resistor 452 variable, the RC time constant is controlled, and the length of lamp activation is controllable.

Also connected to the collector of transistor 445 is an RF transmission circuit 85 which preferably resonates at approximately 300 MHz when the voltage at the collector of transistor 445 goes high. RF transmission circuit includes SAW resonator CR1, inductor L1, capacitors C1, C2, C3, npn transistor Q1, pnp transistor Q2, resistors R1, R2, R3, R4, R5, R6, R7, R8, R9, and an encoder 260. The encoder and its associated switches permits the RF signal which is generated by the transmitter 85 and transmitted over antenna 287 to be encoded in a manner corresponding to the receiver-decoder circuit which will be receiving the signal. In this manner, the RF signal will be "personal" to the user's system.

There have been described and illustrated herein solar powered lighting and alarm systems which are activated by the sensing of the presence of infrared rays emitted by a moving object. While particular embodiments have been described, it is not intended that the invention be limited thereto, as it is intended that the invention be as broad in scope as the art will allow. Thus, while a PIR detector was described as being particularly advantageous in its ability to sense objects emitting infrared rays without requiring a large operating current, it will be appreciated that other types of sensors or detectors which monitor motion (e.g. active beam breaker type systems, ultrasonic, microwave, sound activated, etc.) could be utilized instead. Also, while an RF transmitter was disclosed for the alarm system for transmitting an alarm to a receiver, it will be appreciated that an optical, ultrasonic, microwave, etc. or hardwire connection could be provided in lieu thereof. Further, while a particular preferred circuit for controlling the system has been provided, it will be appreciated that other circuitry could be effectively utilized, and that all or some of such circuitry can be provided on integrated circuits. Therefore, it will be appreciated by those skilled in the art that yet other modifications could be made to the provided invention without deviating from its spirit and scope as so claimed.

I claim:

1. A solar powered lighting system, comprising:
   (a) a solar cell for receiving sunlight and for generating charging current therefrom;
   (b) a rechargeable power source coupled to said solar cell for receiving said current and charging as a result thereof;
   (c) a contactless sensor means for monitoring, without requiring contact between said contactless sensor means and an object, in an area near said sensor means, the movement into the area of the object or a source of radiation, and for providing a signal indicative thereof;
   (d) an amplifier coupled to said contactless sensor means and to said rechargeable power source for amplifying said signal;
   (e) a light source; and
   (f) a control circuit coupled to said amplifier, to said rechargeable power source, and to said light source, including switching means for causing said rechargeable power source to turn on said light source when an amplified signal is received from said amplifier, and timing means for causing said switching means to disconnect said light source from said rechargeable power source after a desired length of time has transpired.

2. A system according to claim , further comprising:
(g) background lighting sensing means coupled to said control circuit, for sensing the level of ambient light, and in conjunction with said control circuit, for preventing said light source from being turned on by said rechargeable power source unless said level of ambient light is below a desired level.

3. A system according to claim 2, wherein:
said contactless sensor means comprises a passive infrared sensor for sensing the presence of long wavelength radiation in said monitored area, and
said background lighting sensing means comprises a photocell which senses the ambient light level.

4. A system according to claim 3, wherein:
said light source is a light bulb rated at at least two watts, and further includes at least one reflector which directs light from said light bulb to desired areas of illumination.

5. A system according to claim 3, further comprising:
(h) a transmitter coupled to said control circuit for transmitting a signal to a remote location upon detection by said contactless sensor means of the movement into said area of an object or source of radiation.

6. A system according to claim 5, wherein:
said transmitter is an RF transmitter for transmitting an RF signal to a receiver at said remote location, said receiver being coupled to a power supply and a second control circuit which controls or switches one of a sound alarm or a light at said remote location.

7. A system according to claim 6, wherein:
said light source is a light bulb of at least two watts, and further includes at least one reflector which directs light from said light bulb to desired areas of illumination.

8. A system according to claim 1, wherein:
said contactless sensor means comprises a passive infrared sensor for sensing the presence of long wavelength radiation in said monitored area.

9. A system according to claim 1, wherein:
said light source is a light bulb rated at at least two watts, and further includes at least one reflector which directs light from said light bulb to desired areas of illumination.

10. A system according to claim 1, further comprising:
(g) a transmitter coupled to said control circuit for transmitting a signal to a remote location upon detection by said contactless sensor means of the movement into said area of an object or source of radiation.

11. A system according to claim 10, wherein:
said transmitter is an RF transmitter for transmitting an RF signal to a receiver at said remote location, said receiver being coupled to a power supply and a second control circuit which controls or switches one of a sound alarm or a light at said remote location.

12. A solar powered alarm system, comprising:
(a) a solar cell for receiving sunlight and for generating charging current therefrom;
(b) a rechargeable power source coupled to said solar cell for receiving said current and charging as a result thereof;
(c) a contactless sensor means for monitoring, without requiring contact between said contactless sensor means and an object, in an area near said sensor means, the movement into the area of the object or a source of radiation, and for providing a signal indicative thereof;
(d) an amplifier coupled to aid sensor means and to said rechargeable power source for amplifying said signal;
(e) an alarm means for providing a sound alarm; and
(f) a control circuit coupled to said amplifier, to said rechargeable power source, and to said alarm means, including switching means for causing said rechargeable power source to turn on said alarm means when an amplified signal is received by said control circuit from said amplifier.

13. A system according to claim 12, wherein:
said alarm means comprises a horn.

14. A system according to claim 12, wherein:
said alarm means comprises a transmitter for transmitting an alarm signal to a receiver at a remote location, said receiver being coupled to a power supply and a second control circuit which controls or witches an alarm at said remote location.

15. A system according to claim 14, wherein:
said alarm means further comprises a sound alarm in relative proximity to said solar cell.

16. A system according to claim 12, further comprising:
(g) background lighting sensing means coupled to said control circuit, for sensing the level of ambient light, and in conjunction with said control circuit, for preventing said alarm means from being turned on by said rechargeable power source unless said level of ambient light is below a desired level.

17. A system according to claim 16, wherein:
said contactless sensor means comprises a passive infrared sensor for sensing the presence of long wavelength radiation in said monitored area; and
said background lighting sensing means comprises a photocell which changes at least one of its characteristics in response to the ambient light level.

18. A system according to claim 17, wherein:
said alarm means comprises a transmitter for transmitting an alarm signal to a receiver at a remote location, said receiver being coupled to a power supply and a second control circuit which controls or switches an alarm at said remote location.

19. A system according to claim 18, wherein:
said control means further comprises timing means for causing said switching means to disconnect said alarm means from said rechargeable power source after a desired length of time has transpired after activation of said alarm means.

20. A system according to claim 12, wherein:
said control means further comprises timing means for causing said switching means to disconnect said alarm means from said rechargeable power source after a desired length of time has transpired after activation of said alarm means.

* * * * *